Aug. 1, 1961 E. KELGARD 2,994,187
METHOD OF OPERATING DUAL FUEL ENGINES
Filed March 3, 1958 2 Sheets-Sheet 1

INVENTOR.
*Erik Kelgard*
BY
*Parker & Carter*
*Attorneys*

Aug. 1, 1961 E. KELGARD 2,994,187
METHOD OF OPERATING DUAL FUEL ENGINES
Filed March 3, 1958 2 Sheets-Sheet 2

INVENTOR.
Erik Kelgard,
BY Parker & Carter
Attorneys.

United States Patent Office 2,994,187
Patented Aug. 1, 1961

2,994,187
METHOD OF OPERATING DUAL FUEL ENGINES
Erik Kelgard, Kamloops, British Columbia, Canada, assignor to Nordberg Manufacturing Company, Milwaukee, Wis., a corporation of Wisconsin
Filed Mar. 3, 1958, Ser. No. 718,863
6 Claims. (Cl. 60—13)

This is a continuation-in-part of U.S. application Serial No. 641,294, filed February 20, 1957, now abandoned.

My invention is in the field of internal combustion engines and is in the nature of a dual fuel engine and a method of operating such an engine. By a dual fuel engine, I mean an engine that is constructed to operate on the diesel cycle with diesel fuel alone being injected into the cylinders and also on Otto cycle with gaseous fuel being supplied and ignited by a small quantity of so-called pilot oil. I shall refer to such an engine merely as a dual fuel engine because the type is well known. I shall refer to the cycle of the engine when operating on diesel fuel alone as the diesel cycle, and the cycle when operating on gaseous fuel with pilot fuel injection as the dual fuel cycle.

Engine manufacturers want to give supercharged dual fuel engines the same rating on both cycles. Prior to my invention, this has been virtually impossible. If the pressure ratio of the supercharger was such that the engine operated efficiently on the diesel cycle, during the dual fuel cycle, the engine would operate roughly due to too lean a mixture in the cylinders. If, on the other hand, the pressure ratio of the supercharger was matched to the dual fuel cycle, during the diesel cycle, the supercharger would not supply enough air for the engine's requirements which would result in incomplete combustion as evidenced by black smoke in the exhaust.

I have observed that the air requirements of a supercharged dual fuel engine, when operating on the diesel cycle, are substantially greater than its requirements when operating on the dual fuel cycle. The supercharger, whether it is driven by the exhaust gases and commonly termed a turbocharger, or driven from the engine crankshaft, must supply air for the engine during both cycles of operation. To obtain the highest rating for the engine, the supercharger must have a pressure ratio sufficient for the engine's requirements on the diesel cycle. In other words, the supercharger must be matched to the air requirement of the engine on the diesel cycle, since the engine's air requirements on the diesel cycle are substantially greater than when operating on the dual fuel cycle.

Therefore, a primary object of my invention is a method of operating a supercharged dual fuel engine so that it will operate efficiently on both cycles of operation.

Another object is a method of operating a dual fuel engine so that the engine may be rated the same or approximately the same on both cycles.

Another object is a dual fuel engine with an exhaust driven supercharger constructed so that the engine will operate smoothly on either the diesel or dual fuel cycle.

Another object is a supercharged intercooled dual fuel engine with an intercooled control responsive to the temperature of the air in the inlet manifold to maintain an approximately constant inlet air temperature during both the diesel and dual fuel cycles.

Another object is a method of operating a supercharged intercooled dual fuel engine to insure ignition during both cycles.

Another object is a dual fuel engine with a turbocharger and an intercooler constructed to prevent either exhaust smoke during the diesel cycle or rough operation during the dual fuel cycle.

Other objects will appear from time to time in the ensuing specification and drawings in which.

Figure 1:
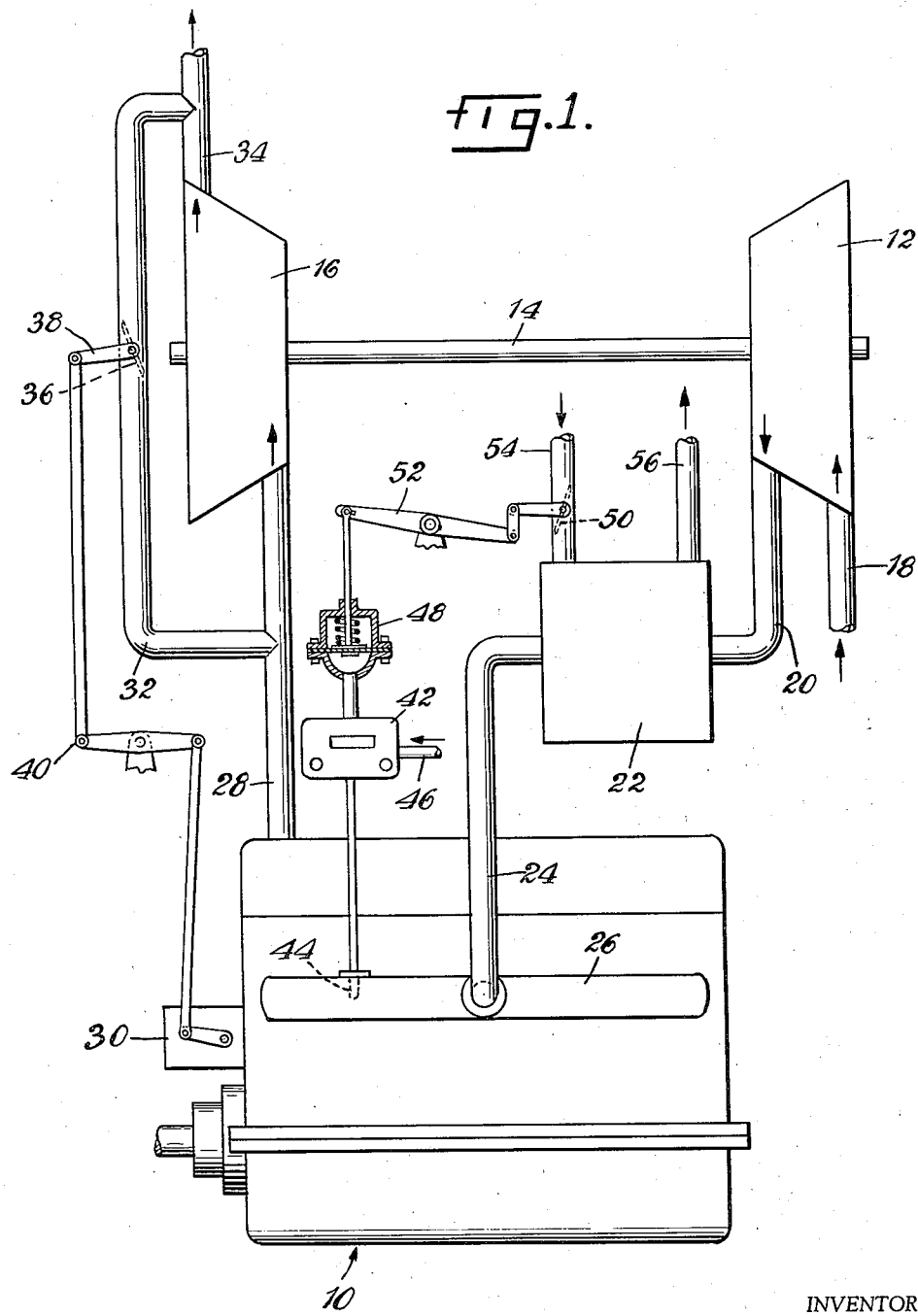
FIGURE 1 is a diagrammatic layout of an engine embodying my invention.

In FIGURE 1, an engine, either two cycle, four cycle, opposed piston or otherwise, is indicated generally at 10. The engine has a turbocharger which includes a compressor 12 coupled in any suitable manner at 14 to an exhaust gas turbine 16 of any suitable type. The compressor has been shown with an inlet duct or line 18 and an outlet 20 leading to an intercooler 22. The compressed cool air is then supplied by a duct 24 to the inlet manifold 26 of the engine. The products of combustion are exhausted by a suitable duct or manifold 28 to the turbine 16. I have indicated the engine governor at 30.

I provide a bypass duct 32 between the engine outlet or exhaust manifold 28 and the exhaust or outlet 34 from the turbocharger. In this duct I may position a suitable valve 36 controlled by a lever 38 or the like. A suitable linkage, indicated generally at 40, connects the valve to, say, the governor 30. The linkage, not shown in detail, is constructed so that when the engine is operating on the diesel cycle, the valve will be closed. But when the engine is operating on the dual fuel cycle, the governor operates the linkage to open the valve 36 a predetermined amount so that a certain portion of the exhaust gas from the engine will be bypassed around the turbocharger. In effect, on the dual fuel cycle, some of the products of combustion from the exhaust manifold may pass around the turbine and be vented to the atmosphere. Since this energy is diverted, the turbocharger speed will be reduced when the engine is operating on the dual fuel cycle, and the pressure of the inlet air in the inlet manifold will be reduced. The bypass 32 need not necessarily be connected to the turbine exhaust 34, but I find this preferable. But it might be merely a vent.

A suitable controller 42 has a temperature responsive bulb 44 inserted in the inlet manifold so that the controller will respond to the temperature of the inlet air. Pressure air from a suitable source, as indicated at 46, is supplied to the controller. The controller, in response to the temperature sensed by the bulb 44, admits more or less of the pressure air to an air motor 48 which may be a conventional type. The air motor controls the position of a valve 50 through a suitable linkage 52. The valve 50 is positioned in the inlet pipe 54 for the cooling fluid supplied to the intercooler, and the outlet pipe for the cooling fluid, be it water or otherwise, is indicated at 56.

The details of the controller 42 and air motor 48 are unimportant as they are commercially available and well known. The point is that the controller responds to the temperature of the air in the inlet manifold to control the intercooler to maintain the manifold temperature constant regardless of load variations or regardless of whether the engine is on the diesel or dual fuel cycle. For example, it might be 135° F.

Figure 2:
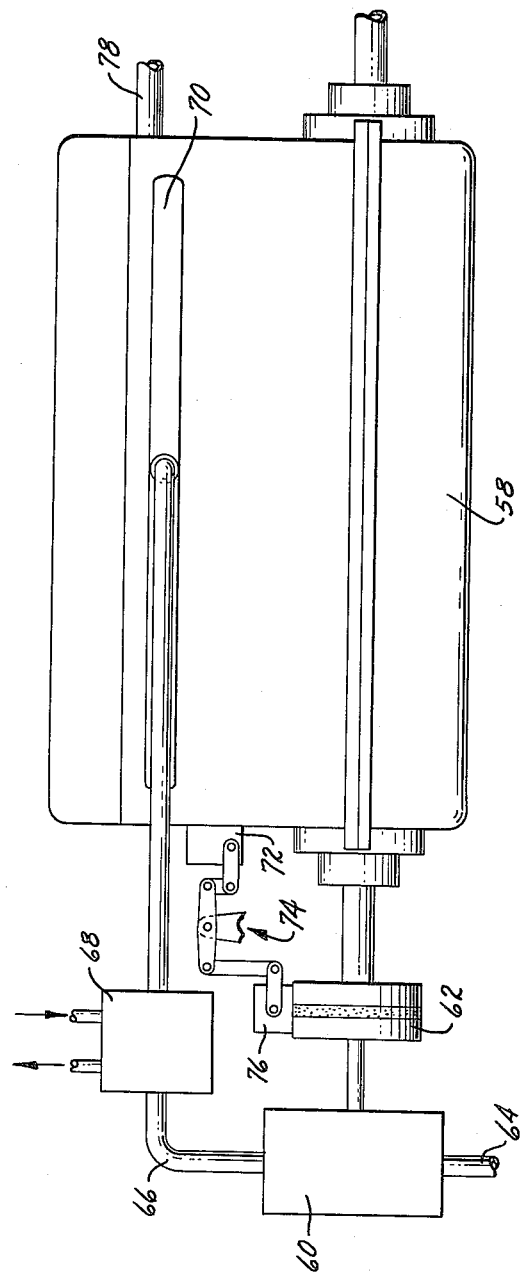
FIGURE 2 is a modified form.

In FIGURE 2 I have shown a modified form in which the engine 58 drives a blower or compressor 60 through a coupling 62. The compressor has an intake 64 and supplies compressed air through a conduit 66 to an intercooler 68, then to the inlet manifold 70 on the engine. The engine governor 72 through a suitable linkage, indicated generally at 74, operates a control 76 on the coupling and the exhaust gas from the engine may be vented through a suitable outlet 78.

In this arrangement the crankshaft driven supercharger supplies air under pressure and is matched or rated to supply the proper amount of air on the diesel cycle. The governor, however, would control the variable drive through the coupling to the supercharger so that during dual fuel operation the air being supplied by the supercharger would be decreased to the proper amount.

The use, operation and function of my invention are as follows:

My invention primarily takes into account the difference in the air requirements of a duel fuel engine. For example, in tests on an actual engine, I have found that the air requirements of the engine while operating on the diesel cycle were on the order of 8.5 lbs. of air per IMEP (indicated mean effective pressure) per hour. But this same engine only required about 6.5 lbs. of air per IMEP per hour when operating on gas with pilot fuel injection. Since such an engine should have a supercharger with a pressure ratio that will satisfy the air requirement of the engine when operating on the diesel cycle, such a supercharger has too high a pressure ratio for the engine when operating on the dual fuel cycle. The important point is that the diesel cycle of the engine requires substantially more air than the dual fuel cycle. An air-fuel ratio on the order of 30–1 is considered conventional for diesel operation. In such a case, for dual fuel operation about 22–1 would be more appropriate. Therefore, I supply air at a higher pressure to the engine during the diesel cycle than during the dual fuel cycle.

If the engine is such that the diesel cycle requires a high capacity turbocharger having a pressure ratio on the order of 3–1, for example, the air outlet pressure of the turbocharger when the engine is operating on the dual fuel cycle will be too high. Therefore, I provide a means for controlling or handling the air supplying device, be it a turbocharger, a crankshaft driven supercharger, or what have you, so that the mixture in the cylinder during the dual fuel cycle will not be too lean.

The bypass duct around the turbine of the supercharger actually bypasses energy from the engine which would otherwise be used to drive the supercharger. Thus, during dual fuel operation, the speed of the supercharger will be lower and air at a lower pressure will be supplied to the engine from the turbocharger compressor.

Guide vanes in the hot inlet to the supercharger turbine might be used to control the energy to the supercharger. For example, one or more supercharger manufacturers make their superchargers with adjustable guide vanes on the turbine so that the angle of the vanes may be adjusted from outside the supercharger. In this case I might tie the control from the governor to the guide vane adjustment so that the guide vanes would be adjusted to vary the amount of energy used by the turbine. But in either case the control on the turbine is such that the energy available to drive the turbine will be reduced when the engine is operating on the dual fuel cycle. The effect of either adjustment will be to have a higher post turbine temperature during dual fuel operation because less energy will be subtracted by the turbine from the exhaust gases from the engine.

A typical example of good operation would be to have about 100% excess air in the cylinders during diesel operation and about 40% excess air during dual fuel operation.

The precise operation of the engine under varying loads on either cycle may be conventional. For example, when the engine is operating on the diesel cycle I might operate it in accordance with the method shown in U.S. Patent No. 2,670,595. Or when the engine is operating on gas fuel with pilot fuel injection on the dual fuel cycle, I might operate it in accordance with the method shown in U.S. Patent No. 2,773,490.

Be this as it may, I find it preferable to adjust the operation of the engine on the diesel and dual fuel cycles so that the efficiency of the turbine is affected. By actually subtracting energy which would otherwise be available for the turbine of the supercharger during the dual fuel cycle, the quantity of air delivered to the engine will be reduced at the same time that the inlet manifold pressure is reduced. I find this highly preferable to an adjustment that, while it dropped the inlet manifold pressure, does not change the air quantity handled by the compressor or does not reduce the energy supplied by the engine and used by the turbine.

The invention may also be applied to an engine having a crankshaft driven supercharger such as in FIGURE 2 and the quantity of air supplied by such a supercharger could be decreased during dual fuel operation by a variable drive between the crankshaft and the supercharger. Or one of the previous suggestions might be used.

Also, the invention could be applied to an engine having a heat exchanger instead of an intercooler. This is to say that the heat exchanger could actually add heat to the inlet air, rather than withdrawing it, if that is found desirable. In this respect, 22 in FIGURE 1 may be considered representative of a heat exchanger.

While I have shown a mechanical linkage running to the valve in the bypass and to the intercooler, this could be electrically, pneumatically, hydraulically or otherwise operated. Additionally, the mechanism need not be operated by the governor necessarily. It could be responsive to any mechanism or factor on the engine that would indicate whether the engine was operating on the diesel or the dual fuel cycle. Also, the intercooler controlling valve might be in the intercooler outlet pipe 56.

While I have shown and described the preferred form and suggested several variations of my invention, suitable additional modifications, substitutions, alterations and changes may be made without departing from the invention's fundamental theme. I therefore, wish that the invention be unrestricted except as by the appended claims.

I claim:

1. In a dual fuel engine constructed to operate on the diesel cycle with diesel fuel only or on gaseous fuel with pilot fuel injection, a cylinder and piston, means driving a supercharger, said supercharger supplying relatively high pressure air to the cylinder and having a capacity such that, during operation on the diesel cycle, the mixture in the cylinder will have the proper air-fuel ratio for diesel operation, and means for substantially reducing the quantity of air supplied to the cylinder by the supercharger when the engine is operating on gaseous fuel with pilot fuel injection, including means for controlling the energy supplied from the engine so that the air-fuel ratio of the mixture will be substantially reduced when the engine is operating on gaseous fuel with pilot fuel injection.

2. The structure of claim 1 further characterized in that said supercharger driving means includes a turbine which is driven by exhaust gases from the cylinder, and wherein said means for substantially reducing the quantity of air supplied includes a vent in the exhaust between the cylinder and the supercharger turbine constructed to divert exhaust gas away from the supercharger turbine to reduce its speed when the engine is operating on gaseous fuel with pilot fuel injection.

3. The structure of claim 1 further characterized in that the supercharger supplies air at a rate such that, during operation on the diesel cycle, the air-fuel ratio of the mixture in the cylinders will be on the order of 30–1, and wherein said means for substantially reducing the quantity of air supplied operates so that, during operation on gaseous fuel with pilot fuel injection, the air-fuel ratio of the mixture in the cylinders will be on the order of 22–1.

4. The structure of claim 1 further characterized in that the supercharger driving means includes a turbine driven by exhaust gases from the cylinder.

5. The structure of claim 1 further characterized in that the engine includes a crankshaft and further characterized in that the supercharger driving means includes a coupling connecting the crankshaft to the supercharger.

6. In a dual fuel engine constructed to operate on the diesel cycle with diesel fuel only or on the dual fuel cycle with gaseous fuel and pilot fuel injection, a cylinder and piston, a supercharger, means for driving the supercharger, the supercharger having a pressure ratio generally matched to the engine's air requirements when operating on the diesel cycle, and means for decreasing the pressure ratio of the supercharger when operating on the dual fuel cycle without lowering its inlet pressure so that the amount of air being supplied by the supercharger will lower the air fuel ratio of the mixture in the cylinder.

References Cited in the file of this patent

UNITED STATES PATENTS

| | | |
|---|---|---|
| 1,371,444 | Sherbondy | Mar. 15, 1921 |
| 1,705,876 | Peterson | Mar. 19, 1929 |
| 1,792,028 | Peterson | Feb. 10, 1931 |
| 2,198,516 | Schutte | Apr. 23, 1940 |
| 2,400,247 | Miller et al. | May 14, 1946 |
| 2,509,960 | Calhoun | May 30, 1950 |
| 2,559,623 | Holmes | July 10, 1951 |
| 2,703,561 | Froehlich | Mar. 8, 1955 |
| 2,731,792 | Nallinger | Jan. 24, 1956 |
| 2,748,562 | Kauffmann | June 5, 1956 |